G. W. & A. C. SANFORD.

CLOCK BELL.

No. 10,253. Reissued Dec. 5, 1882.

WITNESSES

E. L. Nottingham.

Ed. F. Downing.

INVENTORS

G W Sanford.

and

A C Sanford.

By H A Seymour Attorney

N. PETERS, Photo-Lithographer, Washington, D.C.

UNITED STATES PATENT OFFICE.

GEORGE W. SANFORD AND AARON C. SANFORD, OF NEW HAVEN, CONN.

CLOCK-BELL.

SPECIFICATION forming part of Reissued Letters Patent No. 10,253, dated December 5, 1882.

Original No. 258,609, dated May 30, 1882. Application for reissue filed October 2, 1882.

*To all whom it may concern:*

Be it known that we, GEO. W. SANFORD and AARON C. SANFORD, of New Haven, in the county of New Haven and State of Connecticut, have invented certain new and useful Improvements in Clock-Bells; and we do hereby declare the following to be a full, clear, and exact description of the invention, such as will enable others skilled in the art to which it pertains to make and use the same.

Our invention relates to an improvement in wire clock-bells, the object being to provide an article of this character which shall have a greatly-improved quality of tone, and which shall combine simplicity of construction with durability in use.

With this end in view our invention consists in certain details of construction and combinations of parts, as will be hereinafter described, and pointed out in the claims.

Figure 1:
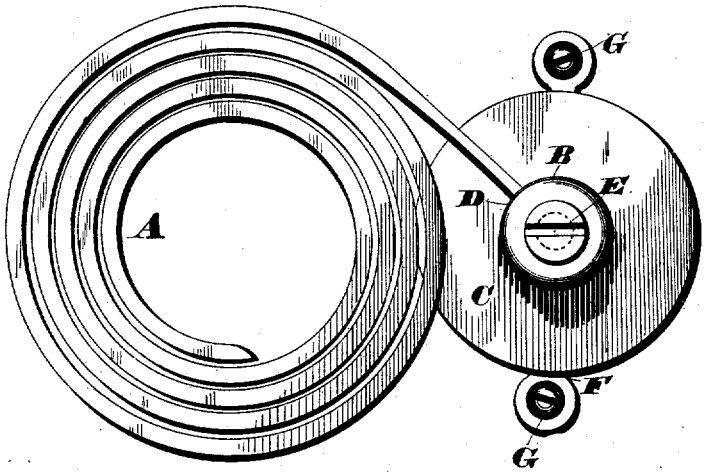
Figure 2:
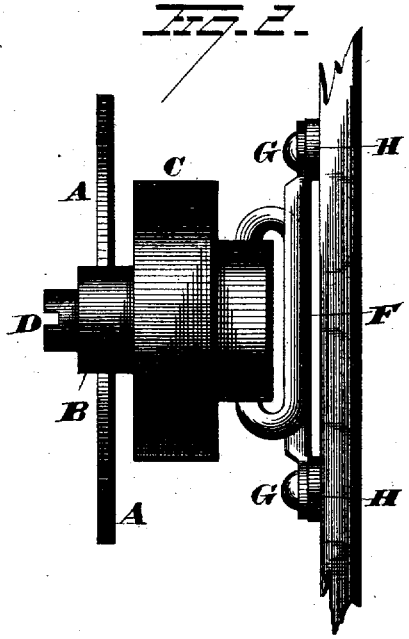

In the accompanying drawings, Figure 1 is a view in front elevation of a clock bell or gong constructed in accordance with our invention, and Fig. 2 is a view thereof in end elevation.

The bell-wire A consists of a flat wire coiled edgewise, its inner end being secured, by soldering or otherwise, to a metallic collet, B, adapted to be secured to the sounding-disk C by means of a screw, D, which enters a hole, E, therein. The wire, being coiled edgewise, secures certain important advantages over the ordinary construction of bells having the coils wound flatwise. In the latter the coils are quite flexible, so that oftentimes they will be thrown in contact by the force of the hammer, and produce what is termed a "double stroke," and thus destroy the effect of the tone of the bell; but by winding the bell-wire edgewise it has greater radial strength, the several coils being of greater stiffness, so that double strokes are entirely avoided. Again, by winding the wire edgewise the bell retains its sound for a greater length of time, and produces a prolonged tone not possible with the ordinary form of bell. The said sounding-disk C is cast on a bent wire, F, which is inserted into the mold wherein the disk is formed, the ends of the wire being flattened and perforated to receive the screws G, which secure the bell to the clock-case. Small rubber washers H, interposed between the flattened ends of the wire F and the clock-case, constitute an elastic support for the bell and improve the quality of its tone.

When a bell constructed in accordance with our invention is struck with a suitable hammer a clear tone of low pitch is produced, which will be prolonged with beautiful effect.

Other devices than those shown may be resorted to for securing the sounding-disk to the clock-case, and the bell-wire may be secured to the disk in a different manner. We would therefore have it understood that we do not limit ourselves to the exact construction shown and described, but that we hold ourselves at liberty to make such slight changes and alterations as fairly fall within the spirit and scope of our invention.

Having fully described our invention, what we claim as new, and desire to secure by Letters Patent, is—

1. A clock-bell consisting of a bell-wire fastened to a sounding-disk and a wire fastened to the sounding-disk and crossed beneath the same, the ends of the wire being perforated for the insertion of fastening-screws, substantially as set forth.

2. A clock-bell consisting of a bell-wire fastened to a sounding-disk and a supporting-wire on which the sounding-disk is cast, substantially as set forth.

3. The combination, with the sounding-disk, bell-wire, and supporting-wire, of the rubber washers interposed between the ends of the supporting-wire and clock-case, substantially as set forth.

4. A flattened bell-wire, the flattened portion coiled in the plane of the vibrations, substantially as set forth.

GEORGE W. SANFORD.
AARON C. SANFORD.

Witnesses:
ELI MIX,
GEORGE R. BILL.